Patented Feb. 17, 1953

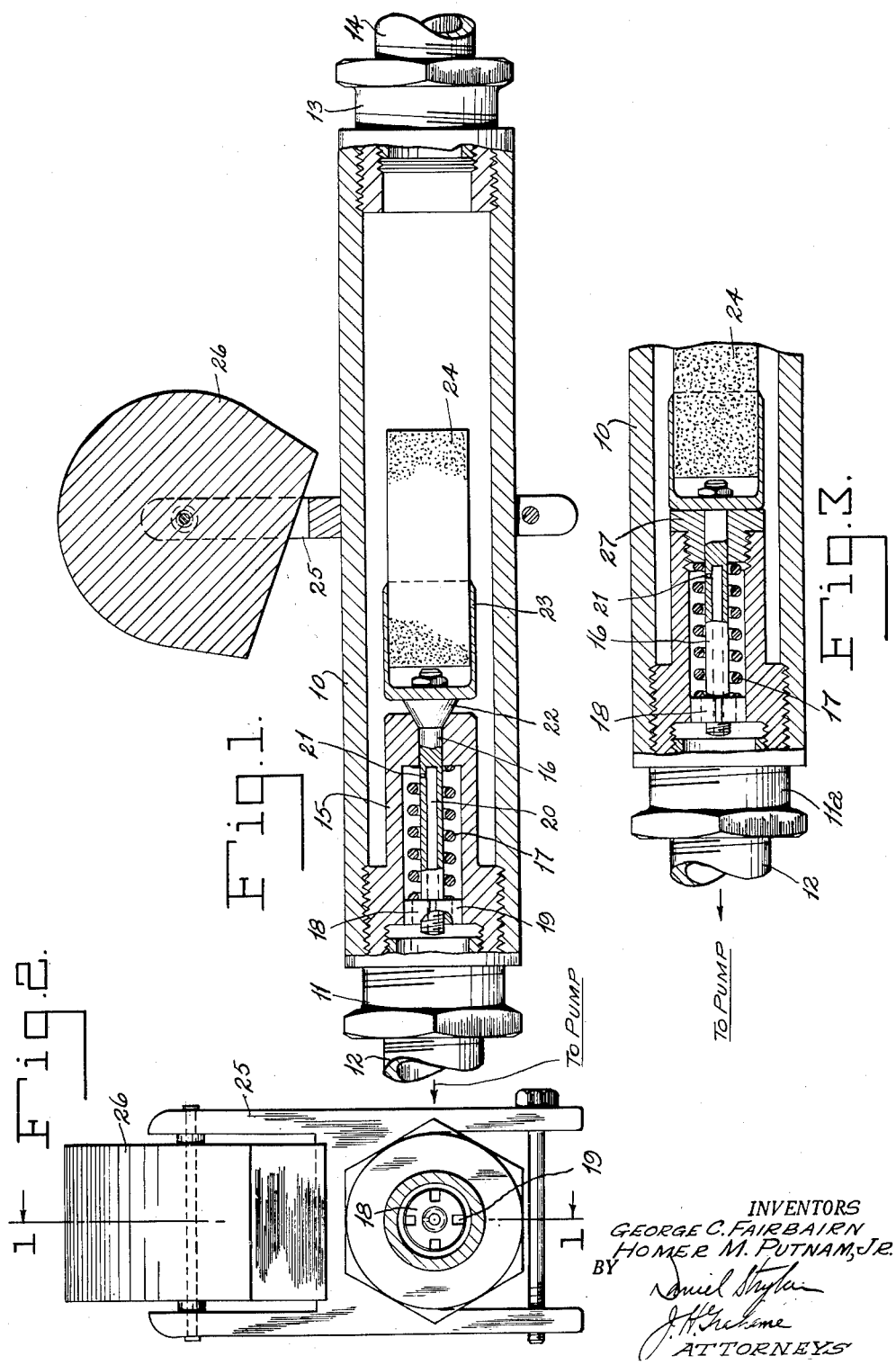

2,629,089

UNITED STATES PATENT OFFICE 2,629,089

FEED INDICATOR FOR LIQUID PUMPS

George C. Fairbairn and Homer M. Putnam, Jr., Port Arthur, Tex., assignors to The Texas Company, New York, N. Y., a corporation of Delaware Application April 14, 1950, Serial No. 155,953

1 Claim. (Cl. 340—239)

This invention relates to feed indicators for liquid pumps such as oil pumps in force feed lubricating systems and contemplates the provision of an indicator in the feed line of the oil pump adapted to show whether the oil is being fed through the feed line.

The invention seeks to provide an indicator that is extremely sensitive to the pulsations in the feed line and which will indicate positively the condition in the line with respect to the delivery of feed.

In accordance with the invention a piston or plunger carrying a magnetic element is inserted in the feed line and is actuated by the impulses of liquid from the feed pump. Exteriorly of the feed line and within the magnetic field of the magnetic element carried by the piston, indicating means is provided for indicating the reciprocating movement of the magnetic element within the feed line. Thus, each impulse of the liquid pump is reflected in a movement of the exterior indicating means.

In apparatus constituting an embodiment of the invention the piston or plunger which is actuated by the feed from the pump is provided with a central bore or passageway open to receive liquid from the feed pump. This passageway terminates in a peripheral port which, in the retracted position of the piston, is within the piston cylinder. Upon the forward movement of the piston actuated by the liquid the peripheral port is moved outside the cylinder so as to discharge the liquid into the feed line.

In accordance with one aspect of the invention the piston carries an extension which protrudes outside the cylinder and includes a valve element adapted to be seated in the outer end of the cylinder when the piston is in the retracted position to constitute a check valve in the system.

Referring to the accompanying drawings

Figure 1 is a longitudinal sectional view of an apparatus constructed in accordance with the invention and constituting an embodiment thereof.

Figure 2 is an end view of the apparatus.

Figure 3 is a partial longitudinal section of a modified apparatus.

In the drawings 10 indicates a tubular casing which is adapted to be inserted in the feed line of the liquid pump and when thus positioned constitutes a segment of the feed line. A coupling member 11 serves to connect one end of the casing 10 with the feed line 12 which extends to the pump. The other end of the casing is connected by a coupling 13 with the feed line 14 which delivers the liquid or lubricant to the point desired.

As shown in the drawing the member 11 includes a portion 15 which constitutes a housing or cylinder for a piston or plunger 16. This construction in which the coupling member and the cylinder are integral constitutes a convenient construction for ready installation. The bore of the cylinder extends entirely through the cylinder, the outer portion being of a diameter to provide a good working fit for the piston 16, and the inner portion being of enlarged diameter to accommodate a spring 17. The inner end of the piston carries a guide member 18 which also constitutes a stop for the spring. The guide member is in the form of a disc preferably having openings or cut away portions 19.

The piston 16 is provided with a central bore or passageway 20 open at the inner end to receive liquid from the pump and extending for a portion of the length of the piston. The bore 20 communicates with a peripheral port 21. The port 21 is so positioned that when the piston is in the retracted position the port is within the cylinder 15 and when the piston is moved to the extended position the port is moved beyond the cylinder so as to discharge the liquid into the casing 10.

The outer end of the cylinder 16 is provided with an enlarged or flared portion 22 which is adapted to fit into a cooperating seat formed at the end of the cylinder. The spring 17 tends to hold the piston in the retracted position with the member 22 on its seat. This member thus constitutes a check valve in the system.

A cup 23 is secured to the outer flared portion 22 of the piston and contains a magnetic slug 24. The casing 10 and the cylinder and piston are constructed of copper or brass or other suitable non-magnetic material. A framework 25 is mounted on the casing 10 and provides a pivotal support for a permanent magnet 26. A horseshoe magnet has been found extremely sensitive in following the movements of the magnetic element 24.

In operation with each impulse of the feed pump the piston is moved forwardly until the peripheral port 21 is moved outside the cylinder 15 with resultant discharge of the liquid into the casing 10. The spring 17 then functions to move the piston back into the retracted position. As the piston carrying the magnetic slug is reciprocated within the casing 10 the magnet 26 oscillates on its pivot in accordance with the movement of the magnetic slug. It is advantageous to provide a transparent housing over the visual indicating means 26.

Various means may be employed in lieu of the magnet 26 to reflect the movement of the reciprocating magnet 24. For example, an ammeter may be mounted on the casing 10. Ammeters are commonly equipped with a magnetic element which is actuated to move the needle as current flows through the coils of the ammeter. In using such ammeters as the indicating means the usual ammeter coils are not required. The movement of the magnetic element 24 is reflected directly upon the magnetic element in the ammeter to cause the needle to move. A microammeter may also be used to indicate the reciprocating movement of the magnetic element 24. In this case a coil is mounted exteriorly of the casing 10 in the field of the internal magnet 24 and is connected to a zero centered microammeter. As the magnet 24 moves back and forth within the tube 10 variable amounts of flux will cut the exterior coil and variable amounts of current will flow in the ammeter circuit in alternate directions depending upon the movement of element 24. The ammeter needle will then swing to the right and left of the zero position alternately as the direction and magnitude of the current changes due to the movement of the magnet 24.

In the modification shown in Figure 3 that portion of the cylinder having the reduced diameter bore is not constructed integral with the rest of the cylinder as is shown in Figure 1. Thus in the apparatus of Figure 3 a coupling member 11a is interiorly threaded at the inner end for connection with the feed line and exteriorly threaded for insertion in the casing 10. The outer end of the member 11a is interiorly threaded for the insertion of a bushing 27 having a reduced diameter bore to accommodate the piston 16. The spring 17 is seated between the inner end of the member 27 and the guide 18. In this type of construction the casing 10 and member 11a may be constructed of brass or other suitable nonmagnetic material while the bushing 27 as well as the piston 20 may be formed of stainless steel or other wear and corrosion-resistant material.

An important feature of the invention is the rapid action of the indicating mechanism. The piston 16 is moved out quickly against the spring under the increased pressure accompanying each discharge stroke of the pump and when the port 21 clears the outside face of the cylinder the pressure is reduced and the piston is quickly returned to the retracted position. The openings 19 in the guide or stop 18 are advantageous for the purpose of allowing this member to move easily and quickly through the liquid when the piston is being returned to the retracted position. Thus with the magnet 26 as the exterior indicating means the distance that the port 21 must travel to clear the cylinder determines the extent of motion which is imparted to the magnet. The ease with which the spring can return the piston determines the speed with which the magnet is returned to its normal position. The speed of movement and the distance traveled cooperate to make the mechanism highly useful as an indicator.

The indicator herein disclosed is adapted for indicating the movement of a liquid feed regardless of whether large or small quantities of liquid are being applied. In view of the extreme sensitiveness of the indicator it has a special field of usefulness in such cases as forced feed lubricating systems where very small quantities of lubricant are fed such as a drop or two with each impulse of the pump. The indicator is also well adapted for indicating the movement of liquids where chemicals are injected or oil is pumped in small quantities such as in experimental operations and in such cases, the indicating system, including the check valve, is particularly advantageous.

Although a preferred embodiment of the invention has been set forth in connection with apparatus having a particular construction and arrangement of parts and mode of operation, it will be seen that various changes and modifications may be made therein, while securing to a greater or less extent some or all of the benefits of the invention, without departing from the spirit and scope thereof.

We claim:

In an indicator for liquid feed pumps, a tubular member adapted for insertion in the pump feed line, a cylindrical member affixed to the inner wall of said tubular member and having a longitudinal bore extending therethrough with the inner portion of said bore being of larger diameter than the outer portion which latter portion constitutes a good working fit for the hereinafter specified piston, a piston mounted for movement within said bore and adapted upon its forward movement to protrude beyond the outer end of the cylindrical member, said piston being provided with a longitudinal bore extending for a portion of the length thereof and open at the inner end thereof to receive the liquid to actuate it, resilient means disposed in the larger diameter portion of the bore in the cylindrical member tending to hold the piston in the retracted position, a peripheral port in the piston in communication with the longitudinal bore therein and positioned to be within the cylindrical member in the retracted position of the piston and to be outside of the cylindrical member in the forward position of the piston, a magnetic element carried by the piston and means positioned exteriorly of the aforesaid tubular member adapted to indicate the reciprocating movement of the piston-carried magnetic element.

GEORGE C. FAIRBAIRN.
HOMER M. PUTNAM, Jr.

REFERENCES CITED

The following references are of record in the file of this patent:

UNITED STATES PATENTS

| Number | Name | Date |
|---|---|---|
| 1,490,901 | Hendricks, Jr. | Apr. 15, 1924 |
| 2,419,942 | Brewer | May 6, 1947 |
| 2,465,735 | Lieberkerr | Mar. 29, 1949 |

FOREIGN PATENTS

| Number | Country | Date |
|---|---|---|
| 53,355 | Austria | May 10, 1912 |
| 193,955 | Switzerland | Feb. 1, 1938 |